(12) United States Patent
Powers, III

(10) Patent No.: US 10,396,706 B2
(45) Date of Patent: Aug. 27, 2019

(54) FLAT ROOF SOLAR SENSOR STRUCTURES AND CLAMP

(71) Applicant: John Powers, III, Phoenix, AZ (US)

(72) Inventor: John Powers, III, Phoenix, AZ (US)

( * ) Notice: Subject to any disclaimer, the term of this patent is extended or adjusted under 35 U.S.C. 154(b) by 306 days.

(21) Appl. No.: 14/623,043

(22) Filed: Feb. 16, 2015

(65) Prior Publication Data

US 2015/0263666 A1 Sep. 17, 2015

Related U.S. Application Data

(60) Provisional application No. 61/944,452, filed on Feb. 25, 2014.

(51) Int. Cl.
| | |
|---|---|
| *F16B 2/06* | (2006.01) |
| *H02S 20/24* | (2014.01) |
| *H02S 30/10* | (2014.01) |
| *F24S 25/636* | (2018.01) |
| *B25B 5/10* | (2006.01) |
| *B25B 5/06* | (2006.01) |
| *B25B 5/00* | (2006.01) |

(52) U.S. Cl.
CPC ............. *H02S 20/24* (2014.12); *F16B 2/065* (2013.01); *F24S 25/636* (2018.05); *H02S 30/10* (2014.12); *B25B 5/00* (2013.01); *B25B 5/067* (2013.01); *B25B 5/10* (2013.01); *Y02B 10/12* (2013.01); *Y02B 10/20* (2013.01); *Y02E 10/47* (2013.01); *Y10T 29/49826* (2015.01)

(58) Field of Classification Search
None
See application file for complete search history.

(56) References Cited

U.S. PATENT DOCUMENTS

| | | | | | |
|---|---|---|---|---|---|
| 3,906,592 | A | * | 9/1975 | Sakasegawa | ......... F16L 3/1236 24/487 |
| 4,571,013 | A | * | 2/1986 | Suffi | ......... H01R 4/64 439/393 |
| 9,065,191 | B2 | * | 6/2015 | Martin | ......... H01R 4/26 |
| 2010/0095492 | A1 | * | 4/2010 | Boone | ......... H01R 4/2408 24/457 |

(Continued)

FOREIGN PATENT DOCUMENTS

| | | | | | |
|---|---|---|---|---|---|
| GB | 2393209 A | * | 3/2004 | | ......... B25B 5/10 |
| KR | 10-2010-0000615 | | * 1/2010 | | ......... F16B 7/04 |

*Primary Examiner* — Tamir Ayad

(74) *Attorney, Agent, or Firm* — Parsons & Goltry; Robert Parsons; Michael Goltry

(57) ABSTRACT

A solar panel clamp and method of fabrication for use in affixing solar panels in the channels of elongated purlins includes a strip of sheet metal bent into an elongated U-shaped channel with a longitudinal mid-portion designated a clamp end. The channel defines a base or bight of the U-shape and channel sides extending substantially perpendicular to the base. Portions are removed from both channel sides adjacent the clamp end. The elongated channel is bent into a U-shape with the clamp end defining a bight of the U-shape and including substantially parallel, spaced apart opposed legs extending from the clamp end with the removed portions allowing limited movement of the spaced apart legs toward and away from each other. A position fixing device is associated with the clamp and designed to move the spaced apart legs toward each other in a clamping orientation.

5 Claims, 6 Drawing Sheets

(56) References Cited

U.S. PATENT DOCUMENTS

| | | | |
|---|---|---|---|
| 2012/0100762 A1* | 4/2012 | Michell | H01R 4/42 439/789 |
| 2016/0020529 A1* | 1/2016 | Martin | H01R 4/2408 439/391 |

* cited by examiner

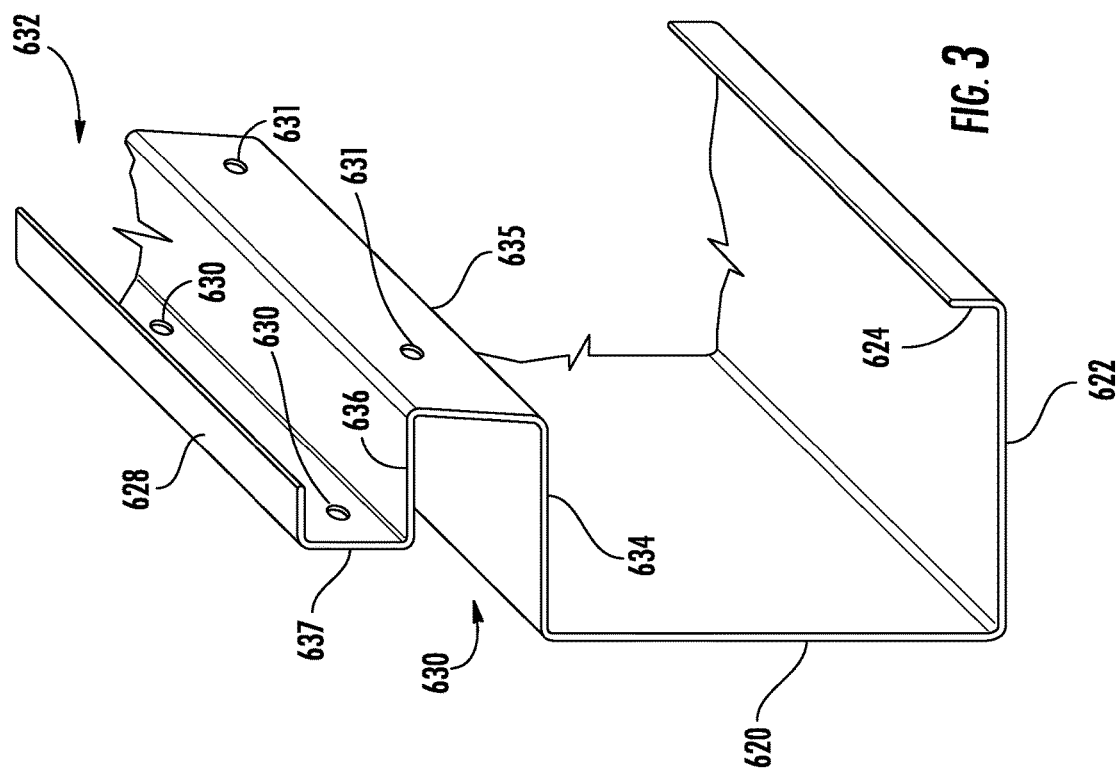
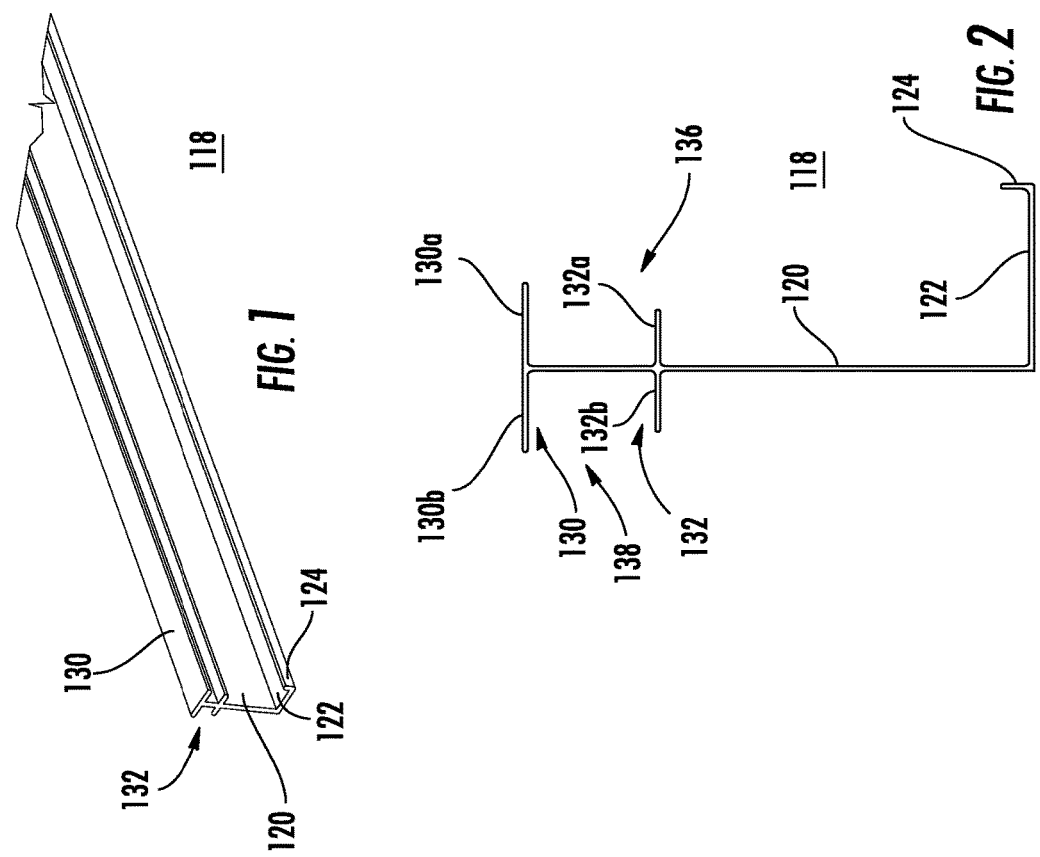

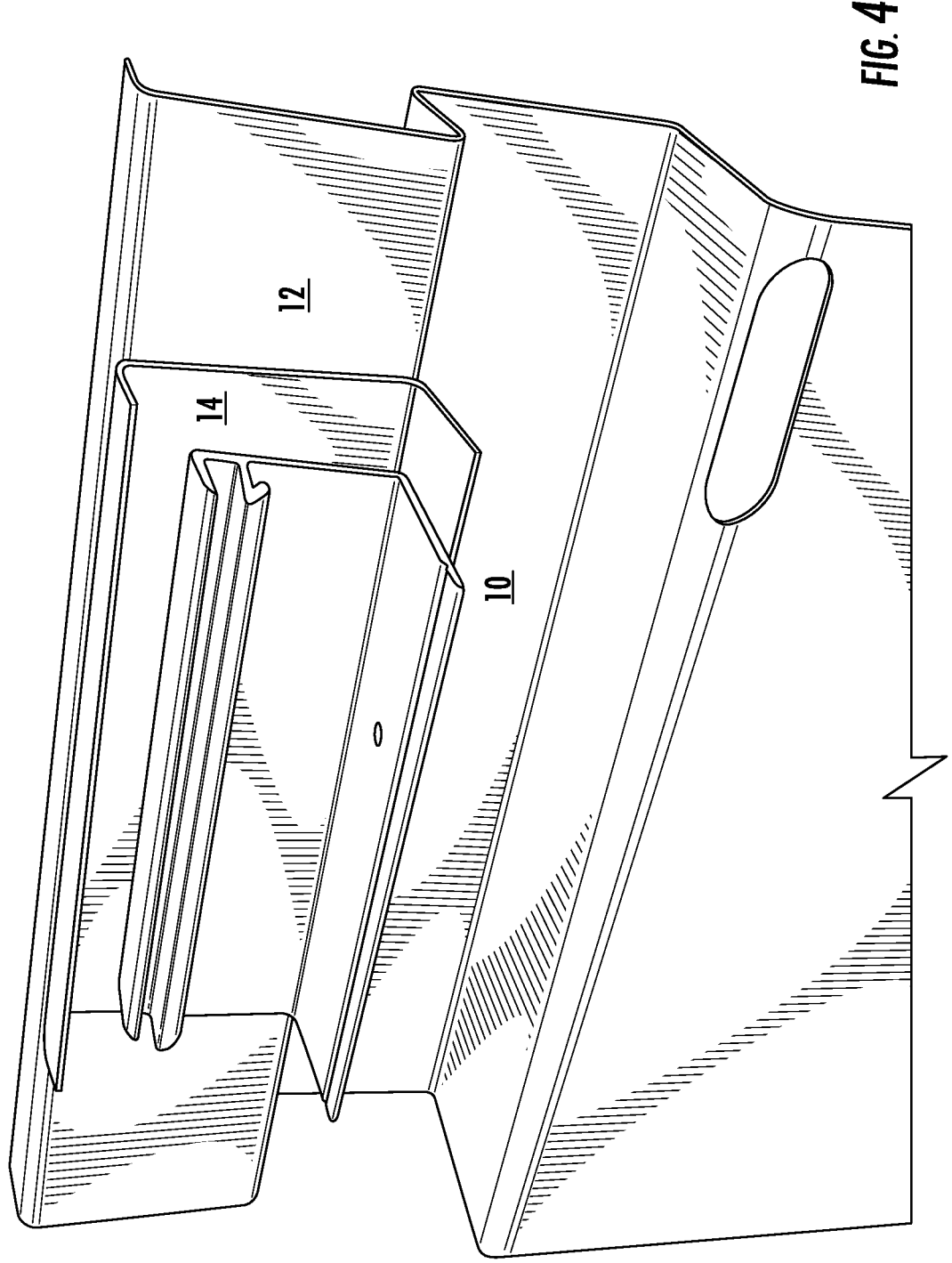

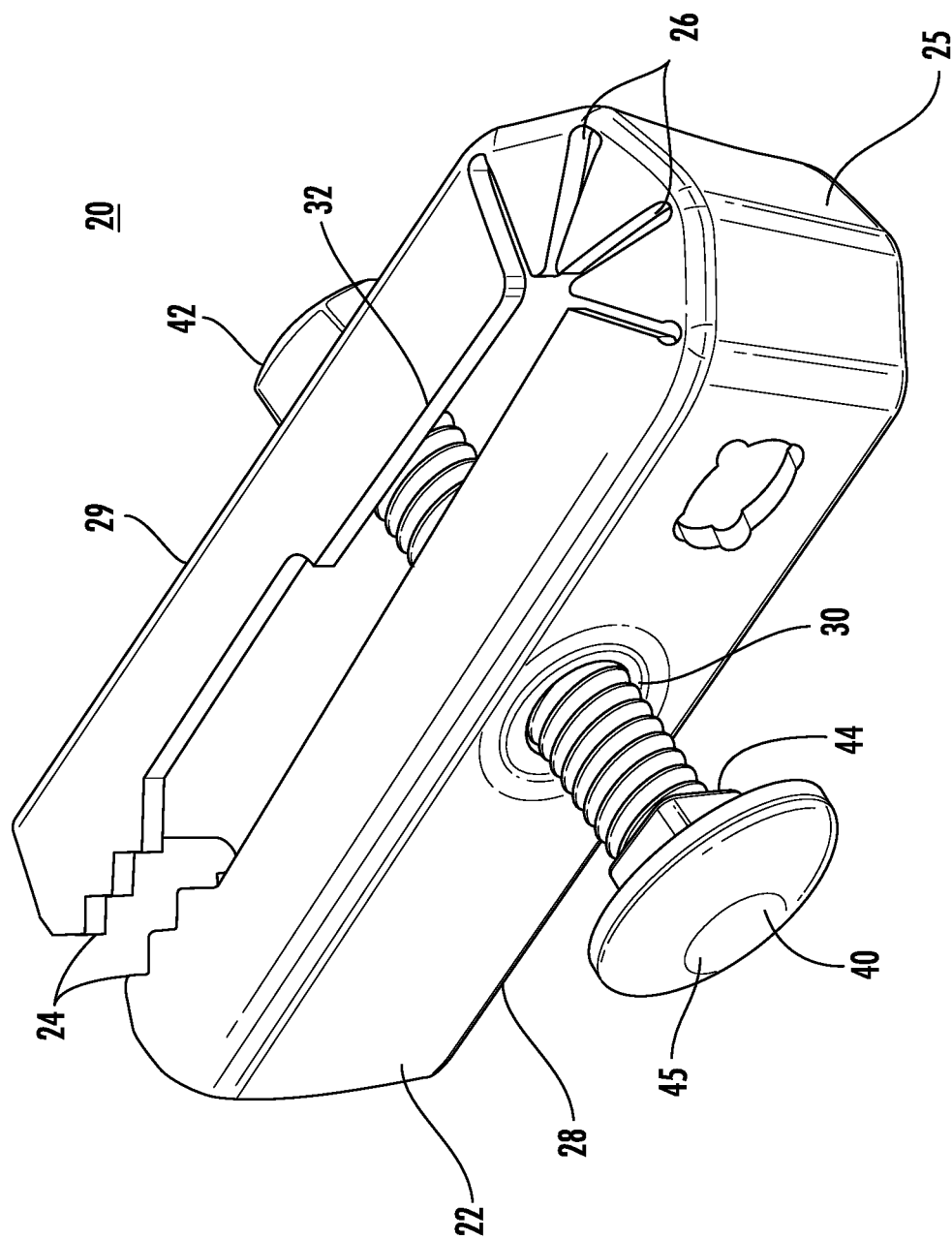

FLAT ROOF SOLAR SENSOR STRUCTURES AND CLAMP

CROSS-REFERENCE TO RELATED APPLICATION

This application claims the benefit of U.S. Provisional Patent Application No. 61/944,452, filed 25 Feb. 2014.

FIELD OF THE INVENTION

This invention generally relates to solar panels or flat roof sections mounted on or forming the flat roof and more specifically to a clamp for fixedly attaching the solar panels to a flat roof structure.

BACKGROUND OF THE INVENTION

At the present time, metal flat roof structures and/or solar panel mounts include purlins in a generally C-shape or, in some instances, a box-shape for extra strength. The solar panels are then mounted on the purlins by means of bolts, screws, or other fastening devices. The purlins have an upper flat surface to which the solar panels are attached. The problem that arises is that the process of attaching the solar panels to the upper flat surface of the purlins is exceptionally difficult and time consuming.

For example, the solar panels or other roof sections must be placed on the upper flat surface of the purlins which can be a difficult task for larger roof areas, and then attached to the purlins by some attachment devices. The attachment devices can, primarily, be only inserted through the purlins and into the roof sections from the bottom or beneath the roof. This can be a daunting task since the roof sections are loose and held in place only by their weight. Thus, during the step of fixing the roof sections to the purlins the roof sections can become misaligned or incompletely attached. That is some bolts, screws, or other attachment devices can be inadvertently inserted through the solar panel proper or roof section proper rather than through supporting structures surrounding the solar panels or roof sections. Also, even if the assembly is error free, the task is very work intensive with the time and effort increasing as the errors are eliminated or attempted to be eliminated.

It would be highly advantageous, therefore, to remedy the foregoing and other deficiencies inherent in the prior art.

Accordingly, it is an object of the present invention to provide a new and improved clamp for attaching solar panels to a flat roof structure.

It is another object of the present invention to provide a new and improved clamp that is simple to manufacture and easy to use in the field.

SUMMARY OF THE INVENTION

Briefly, to achieve the desired objects of the instant invention in accordance with a preferred embodiment thereof, a solar panel clamp for use in affixing solar panels in the channels of elongated purlins is disclosed. The clamp includes a strip of sheet metal bent into an elongated U-shaped channel with a longitudinal mid-portion designated a clamp end. The channel defines a base or bight of the U-shape and channel sides extending substantially perpendicular to the base. Portions are removed from both channel sides adjacent the clamp end and the elongated U-shaped channel is bent into a U-shape with the clamp end defining a bight of the U-shape and including substantially parallel, spaced apart opposed legs extending from the clamp end with the removed portions allowing limited movement of the spaced apart legs toward and away from each other. A position fixing device is associated with the clamp and designed to move the spaced apart legs toward each other in a clamping orientation.

The desired objects of the instant invention are further realized in accordance with a method of fabricating a solar panel clamp for use in affixing solar panels in the channels of elongated purlins. The method includes providing an elongated strip of sheet metal and bending the strip of sheet metal into an elongated U-shaped channel with a longitudinal mid-portion designated a clamp end. The channel includes a base defining a bight of the U-shape and channel sides extending substantially perpendicular to the base. Portions are removed from both channel sides adjacent the clamp end and the elongated U-shaped channel is bent into a U-shaped clamp with the clamp end defining a bight of the U-shape and including substantially parallel, spaced apart opposed legs extending from the clamp end with the removed portions allowing limited movement of the spaced apart legs toward and away from each other. A position fixing device associated with the clamp is provided.

The desired objects of the instant invention are further realized in accordance with a specific method of fabricating a solar panel clamp for use in affixing solar panels in the channels of elongated purlins. The specific method includes providing an elongated strip of sheet metal and bending the strip of sheet metal into an elongated U-shaped channel with a longitudinal mid-portion designated a clamp end, the channel defining a base or bight of the U-shape and channel sides extending substantially perpendicular to the base. Portions are removed from both channel sides adjacent the clamp end and gripping teeth are formed in the sides of the elongated U-shaped channel at opposite ends. The elongated U-shaped channel is bent into a U-shape with the clamp end defining a bight of the U-shape and including substantially parallel, spaced apart opposed legs extending from the clamp end with the removed portions allowing limited movement of the spaced apart legs toward and away from each other and the gripping teeth extending toward each other from the opposed legs. An inlet hole is formed in the base of the elongated channel approximately midway along a first of the opposed legs and a mating outlet hole is formed in the base of the elongated channel approximately midway along a second of the opposed legs. A carriage bolt is provided with a shaft having a head end and threaded at a distal end, and a portion of the shaft immediately adjacent and in contact with the head having a square cross-section. The inlet hole is formed with a square periphery that matches the square cross-section portion of the carriage bolt shaft and the outlet hole is formed with a round periphery approximately matching the threaded distal end of the carriage bolt shaft.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which:

FIG. 1 is an isometric view of a purlin used in a flat roof structure of the type anticipated for the present invention;

FIG. 2 is an enlarged end view of the purlin illustrated in FIG. 1;

FIG. 3 is an isometric view of another type of purlin used in a flat roof structure of the type anticipated for the present invention;

FIG. 4 illustrates a section of a solar panel frame with the solar sensors removed for better illustrating the frame construction;

FIG. 5 is a perspective view of a solar panel clamp, in accordance with the present invention;

DETAILED DESCRIPTION OF A PREFERRED EMBODIMENT

Figure 6:
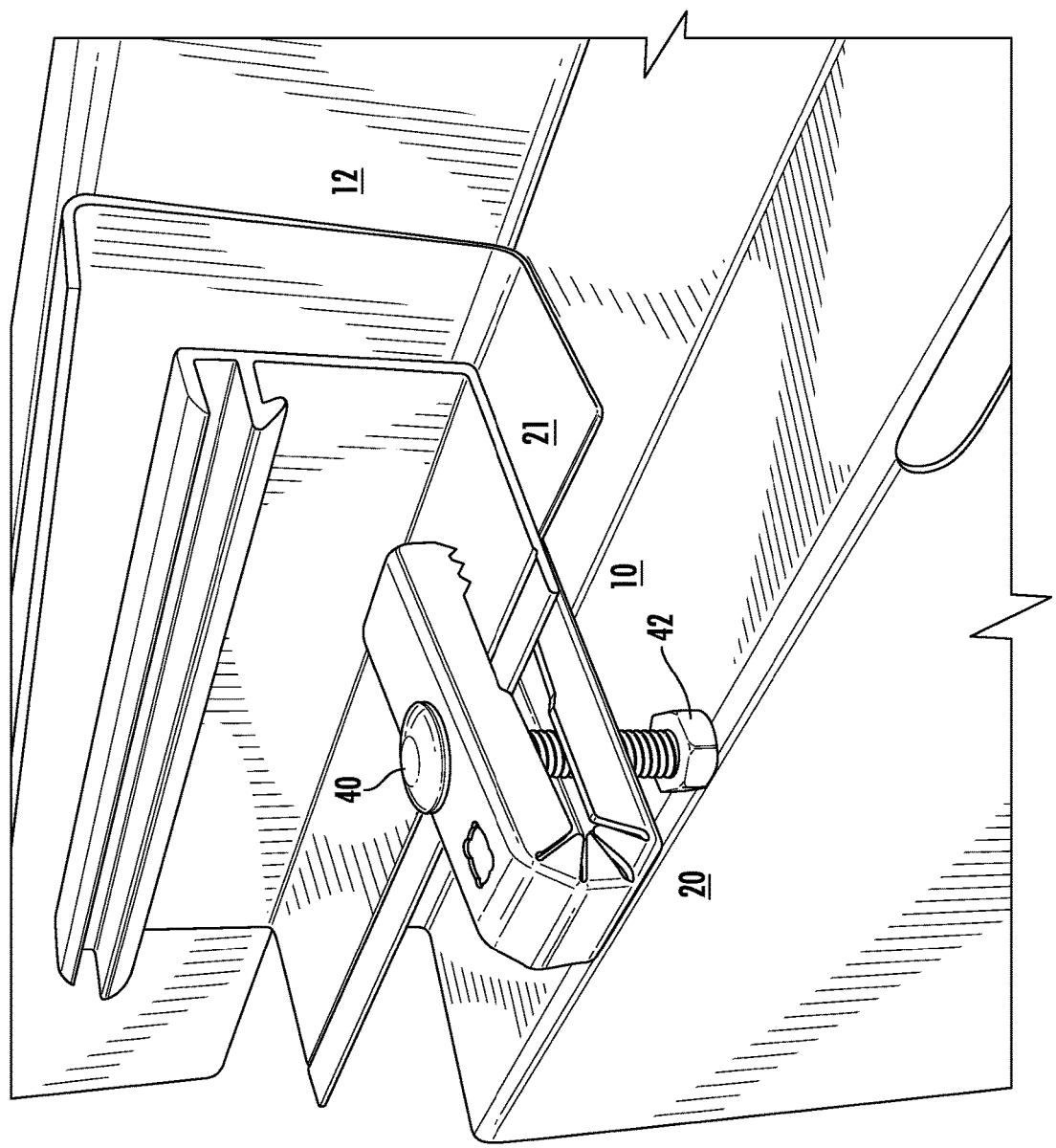
FIG. 6 is a perspective view illustrating the solar panel clamp of FIG. 5 in a clamping position affixing the solar panel frame of FIG. 4 to the purlin of FIG. 2, in accordance with the present invention.

One example of solar panels that can be used for roof sections is provided in United States patent entitled "Solar Support Structure", bearing U.S. Pat. No. 8,511,007, and incorporated herein by reference. For purposes of this disclosure it should be understood that the structures disclosed herein are assembled at the site and it is highly desirable that each step of the assembly procedure be as simple as possible. Basically, each of the roof components (i.e. columns, beams, purlins, and roof sections or solar panels) are provided as individual items from a factory/shop and assembled on site into the desired structure. By providing the items separately each item can be relatively easily handled by workmen conveying the items to the site and by workmen doing the assembling at the site. Briefly, the assembly procedure includes fixing a lower end of each column in the ground or in a base that serves as the ground. One end of a cantilever beam is affixed to the upper end of each column by structure that is described in more detail in a United States patent entitled "Flat Roof Support Structure", bearing U.S. Pat. No. 8,646,230, and incorporated herein by reference.

With the cantilever beams, or a beam supported at the ends, fixedly attached, purlins are attached to the upper surface of the beams in a direction perpendicular to the beam. Again the attachment of the purlins to cantilever beams is illustrated in detail in the above described copending patent application. In the above described patent applications, roof sections or solar panels were attached to the upper surfaces of the purlins using any well-known attachment devices such as screws, bolts, etc. However, attaching solar panels or flat roof sections to the upper surface of the purlins can be extremely difficult and time consuming. To overcome this problem the new and novel solar panel clamp illustrated and described below is used to replace any previous attachment devices.

Purlins illustrated in FIGS. 1-3 are described in more detail in a copending United States patent application entitled "Purlin Construction for Roof Structures", bearing Ser. No. 13/610,228, filed on Sep. 11, 2012, and incorporated herein by reference. It will be understood after a careful reading of the disclosure below that all of the purlins described in the copending application can be used in conjunction with the described clamp and the two purlins selected for illustration are simply examples.

Referring specifically to FIGS. 1 and 2, a purlin 118 includes a major side or upright wall 120 with a lower or mounting wall 122 extending horizontally at a right angle to upright wall 120. An upright flange 124 is optionally formed at the outer edge of mounting wall 122 to add stiffness or additional lateral support to purlin 118. Upright wall 120, mounting wall 122, and flange 124 extend longitudinally the entire length of purlin 118. The lower surface of mounting wall 122 is designed to be mounted to and supported on roof beams, such as cantilever beams 14 in FIG. 1. The attaching of purlins 118 to the roof beams is described in detail in one or both of the above cited copending patent applications and will not be elaborated upon further herein.

A first cross piece 130 is formed integrally with and at the upper end of upright wall 120. Cross piece 130 extends horizontally outwardly in opposite directions from upright wall 120 to form a T-shape with upright wall 120. The portion of cross piece 130 extending outwardly to the right in FIG. 2 is designated 130a and the portion of cross piece 130 extending outwardly to the left in FIG. 2 is designated 130b. In a similar fashion a second cross piece 132 is formed integrally with upright wall 120 and spaced downwardly from cross piece 130. Cross piece 132 extends horizontally outwardly in opposite directions from upright wall 120 to form a T-shape with upright wall 120. The portion of cross piece 132 extending outwardly to the right in FIG. 2 is designated 132a and the portion of cross piece 132 extending outwardly to the left in FIG. 2 is designated 132b.

As can be seen best in FIG. 2, portions 130a and 132a cooperate to form a longitudinally extending channel 136 therebetween. Similarly, portions 130b and 132b cooperate to form a second longitudinally extending channel 138 therebetween positioned in an opposed direction with channel 136. It will be understood that channel 136, along with a facing channel in the next adjacent purlin form a complete track for receiving opposed edges of a solar panel or flat roof section. Similarly, channel 138, along with a facing channel in the next adjacent purlin, form a complete track for receiving and holding opposed edges of an adjacent solar panel or flat roof section.

Referring briefly to FIG. 3, a purlin 618 fabricated in one single integrated structure from a flat strip of sheet metal is illustrated. The various longitudinally extending bends in the strip of metal define a mounting wall 622 with a strengthening flange 624, an upright wall 620, and opposed channels 630 and 632. Channels 630 and 632, along with facing channels in the next adjacent purlins on either side, form complete tracks for receiving and holding opposed edges of adjacent solar panels or flat roof sections. Purlin 618 has the advantage of being fabricated from a single elongated strip of sheet metal which substantially reduces production time and costs.

Thus, solar panels or flat roof sections are quickly and easily positioned in a roof structure by simply sliding them longitudinally into cooperating channels in adjacent purlins. However, for ease in assembly the solar panels or flat roof sections need to be thinner than the channels formed in the purlins. Turning specifically to FIG. 4, a section 10 of a solar panel frame is illustrated with the solar sensors removed to provide a better view of the frame construction. As will be understood by those skilled in the art, section 10 is a portion of a rectangular frame extending completely around the periphery of the solar panel and solar sensors (not shown for convenience) are supported on a horizontal leg 11. To better understand a preferred size relationship between a solar panel and a purlin, section 10 of solar panel is illustrated in position in a channel 12 formed in a purlin. For this example, channel 12 is a portion of purlin 118, illustrated in FIG. 2 or purlin 618 of FIG. 3. Section 10 illustrates that the solar panels discussed herein have a surrounding frame with a generally L-shaped cross-section. Further, the upper end of the vertical arm of the L-shaped cross-section has a channel 14 formed thereon to surround and fixedly engage the outer edges of the solar sensors and hold them rigidly in a horizontal orientation.

Turning specifically to FIG. 5, a solar panel clamp 20, in accordance with the present invention, is illustrated. Clamp 20 can be conveniently formed of sheet metal or the like in the shop in which the purlins and other components of the flat roof structure are formed. In a typical example, a strip of sheet metal is longitudinally bent, i.e. along a longitudinal axis, into an elongated channel 22 with griping teeth 24 formed in the channel sides at opposite ends. A clamp end 25 is determined mid-way along elongated channel 22 and a plurality of wedge shaped portions are removed from both channel sides in the area of clamp end 25. The removal of the wedge-shaped portions facilitates transverse bending, i.e. perpendicular to the longitudinal axis, of elongated channel 22 into a U-shape with substantially parallel legs 28 and 29 whereupon the removed wedge-shaped portions become slots 26 and allow limited movement of legs 28 and 29 toward and away from each other. Also, griping teeth 24 formed in the channel sides at opposite ends are directed inwardly toward each other.

A position fixing device is associated with clamp 20 to tighten legs 28 and 29 into a holding position on the edge of a solar panel (see FIG. 6 and description below). Most conveniently, while clamp 20 is still in the state of being a strip of sheet metal, an inlet hole 30 is punched in a position that ultimately becomes the base of elongated channel 22 approximately midway along leg 28. A mating outlet hole 32 is punched in a position that ultimately becomes the base of elongated channel 22 approximately midway along leg 29. In this example the position fixing device is a carriage bolt 40 which is inserted through hole 30 and hole 32 and a nut 42 is threadedly engaged on the end extending outwardly from hole 32 and side 29. As understood in the art, a portion 44, of the shaft of carriage bolt 40 immediately adjacent and in contact with the head 45, has a square cross-section. Hole 30 is punched with a square periphery that matches the cross-section of portion 44 of carriage bolt 40 so as to conveniently receive portion 44 and hold carriage bolt 40 from rotation relative to clamp 20 during tightening of nut 42 thereon. Thus, a supply of clamps 20 can be conveniently manufactured in the shop and carried to the assembly cite with the other roof components.

Turning now to FIG. 6, a solar panel, represented by section 10, is positioned in a channel 12 of a purlin, as explained above. A clamp 20 is positioned over the horizontal leg 11 of section 10 and the lower wall of channel 12. Since the solar panel is open from the bottom, clamp 20 can be conveniently positioned as shown with the roof completely assembled. Clamp 20 is positioned with carriage bolt 40 extending vertically therethrough and nut 42 conveniently accessible from the bottom. Since carriage bolt 40 is non-rotatably locked in clamp 20, nut 42 can be easily tightened from below to fixedly attach the solar panel in channel 12 (and opposed mating channels). While a single clamp 20 is illustrated in this example it will be understood that as many clamps as needed can be used on a single solar panel or roof section.

Figure 7:
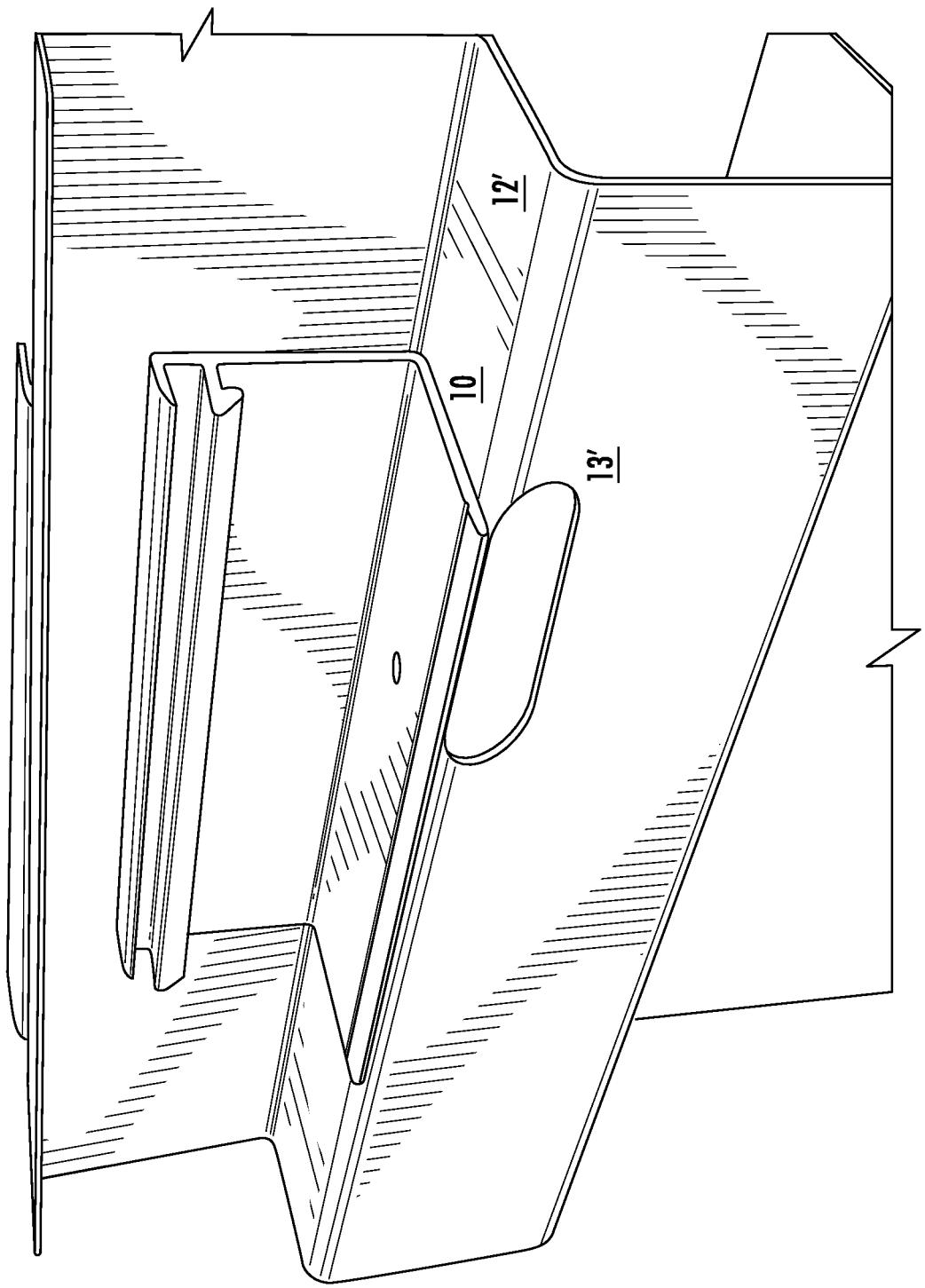
FIG. 7 is a perspective view of the solar panel section of FIG. 4 in combination with a modification of the purlin of FIG. 3 in preparation for attaching the clamp of FIG. 5, in accordance with the present invention.

Turning to FIG. 7, a channel 12' is illustrated in a different embodiment, e.g. purlin 618 illustrated in FIG. 3, and formed as descried in more detail in a copending United States patent application entitled "Purlin Construction for Roof Structures", bearing Ser. No. 13/610,228, filed on Sep. 11, 2012, and incorporated herein by reference. In this example, channel 12', which may be either the upper channel 632 or the lower channel 630, illustrated in purlin 618 of FIG. 3, is modified during the original fabrication by forming a small opening 13' in the vertical wall adjacent the lower wall of the channel. Since purlin 618 is formed of a continuous piece of sheet metal (see FIG. 3), opening 13' is required to allow a clamp 20 (not shown in FIG. 7) to be inserted over the lower leg of section 10 and the lower wall of channel 12'. As described above, the solar panel is open from the bottom and clamp 20 can be conveniently positioned with the roof completely assembled. Clamp 20 is positioned with carriage bolt 40 extending vertically therethrough and nut 42 conveniently accessible from the bottom.

Figure 8:
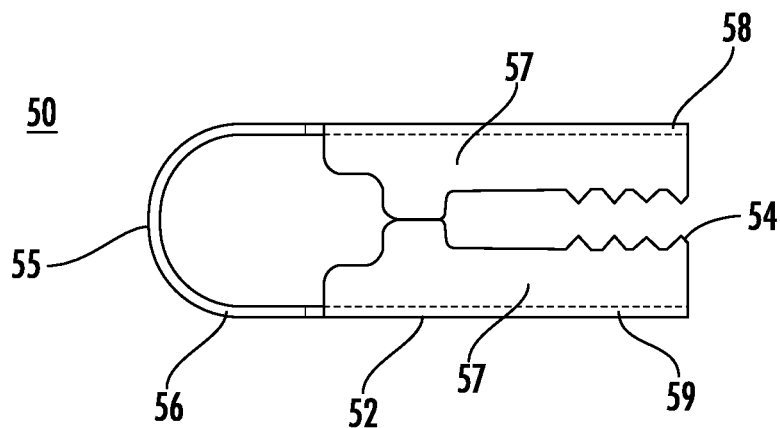
FIG. 8 is a side view of another example of a solar panel clamp, in accordance with the present invention.
Figure 9:
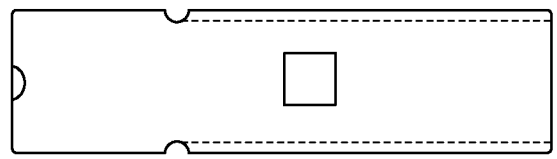
FIG. 9 is a top view of the solar panel clamp of FIG. 8.
Figure 10:
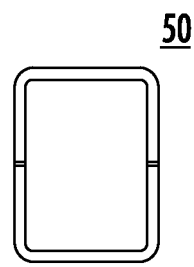
FIG. 10 is an end view of the solar panel clamp of FIG. 8.

Turning to FIGS. 8, 9, and 10, another example of a solar panel clamp 50, in accordance with the present invention, is illustrated. Clamp 50 can be conveniently formed of sheet metal or the like in the shop in which the purlins and other components of the flat roof structure are formed. In a typical example, a strip of sheet metal is longitudinally bent, i.e. along a longitudinal axis, into an elongated channel 52 with griping teeth 54 formed in the channel sides at opposite ends. A clamp end 55 is determined mid-way along elongated channel 52 and portions 56 are removed from both channel sides in the area of clamp end 55. The removal of portions 56 facilitates transverse bending, i.e. perpendicular to the longitudinal axis, of elongated channel 52 into a U-shape with substantially parallel legs 58 and 59 whereupon the removed portions allow limited movement of legs 58 and 59 toward and away from each other. Also, griping teeth 54 formed in the channel sides at opposite ends are directed inwardly toward each other.

Here it will be understood that portions 56 could be removed before the strip of sheet metal is longitudinally bent and the remaining sides, designated 57, could be bent perpendicular to the base before the structure is transversely bent into the solar panel clamp 50. Essentially, the removal of portions 56 is similar to the removal of the wedge-shaped portions Thus, it will be understood that the new and improved clamp can be conveniently used with various purlins for use in assembly of flat roof structures. The combined novel purlins and clamp can be used to easily position and mount solar panels or other flat roof sections with substantially reduced effort and error. The new and improved clamps for use in flat roof structures are manufactured from any convenient metal such as aluminum, sheet steel, etc. The new and improved clamps can be fabricated in a variety of different methods by providing various components that are easily and quickly assembled into a finished product at the factory. Using the multiple component methods of fabrication, the purlins and clamps can be manufactured with substantially reduced machinery cost. Further, the new and improved clamps and purlins can be used to quickly and easily affix solar panels to roof beams at the site and do not require any on-site welding or any special tools.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A solar panel clamp for use in affixing solar panels in the channels of elongated purlins comprising:

a strip of sheet metal longitudinally bent into an elongated U-shaped channel with a longitudinal mid-portion, designated a clamp end, the the U-shaped channel defining legs oppositely extending from the clamp end, each oppositely extending leg having a distal end defined by the U-shaped channel, the U-shaped channel defining a base of the U-shape and channel sides extending substantially perpendicular to the base for the length of the base except for a plurality of gaps formed in each of the channel sides at the clamp end with the plurality of gaps allowing bending of the U-shaped channel at the clamp end;

gripping teeth formed in the channel sides of each of the oppositely extending legs starting at the distal end of each oppositely extending leg and extending inwardly towards the clamp end;

an inlet hole positioned in the base of the U-shaped channel between the clamp end and the gripping teeth in one of the oppositely extending legs, and a mating outlet hole positioned in the base of the U-shaped channel between the clamp end and the gripping teeth in the other of the oppositely extending legs;

the elongated U-shaped channel transversely bent into a U-shaped clamp with the clamp end defining a bight of the U-shaped clamp and the oppositely extending legs positioned to form substantially parallel, spaced apart opposed legs extending from the clamp end, the gripping teeth formed in the channel sides being oriented in an opposed relationship; and a position fixing device with at least a portion designed to be received in the inlet and outlet holes and designed to move the spaced apart legs and the gripping teeth formed therein toward each other in a clamping orientation.

2. A solar panel clamp as claimed in claim 1 wherein the plurality of gaps are a plurality of wedge shaped portions forming slots at the bight of the U-shaped clamp allowing limited movement of the spaced apart legs toward and away from each other.

3. A solar panel clamp as claimed in claim 1 wherein the plurality of gaps are formed in the U-shaped channel sides at the clamp end allowing limited movement of the spaced apart legs toward and away from each other.

4. A solar panel clamp as claimed in claim 1 wherein the inlet hole is defined in the base of the elongated channel approximately midway along a first of the opposed legs and the mating outlet hole is defined in the base of the elongated channel approximately midway along a second of the opposed legs, the inlet and mating outlet holes being designed to receive at least a portion of the position fixing device therethrough.

5. A solar panel clamp as claimed in claim 4 wherein the position fixing device includes a carriage bolt with a shaft having a head end and threaded at a distal end, and a portion of the shaft immediately adjacent and in contact with the head having a square cross-section, the inlet hole having a square periphery that matches the square cross-section portion of the carriage bolt shaft and the outlet hole having a round periphery approximately matching the threaded distal end of the carriage bolt shaft.

\* \* \* \* \*